Figure 1:
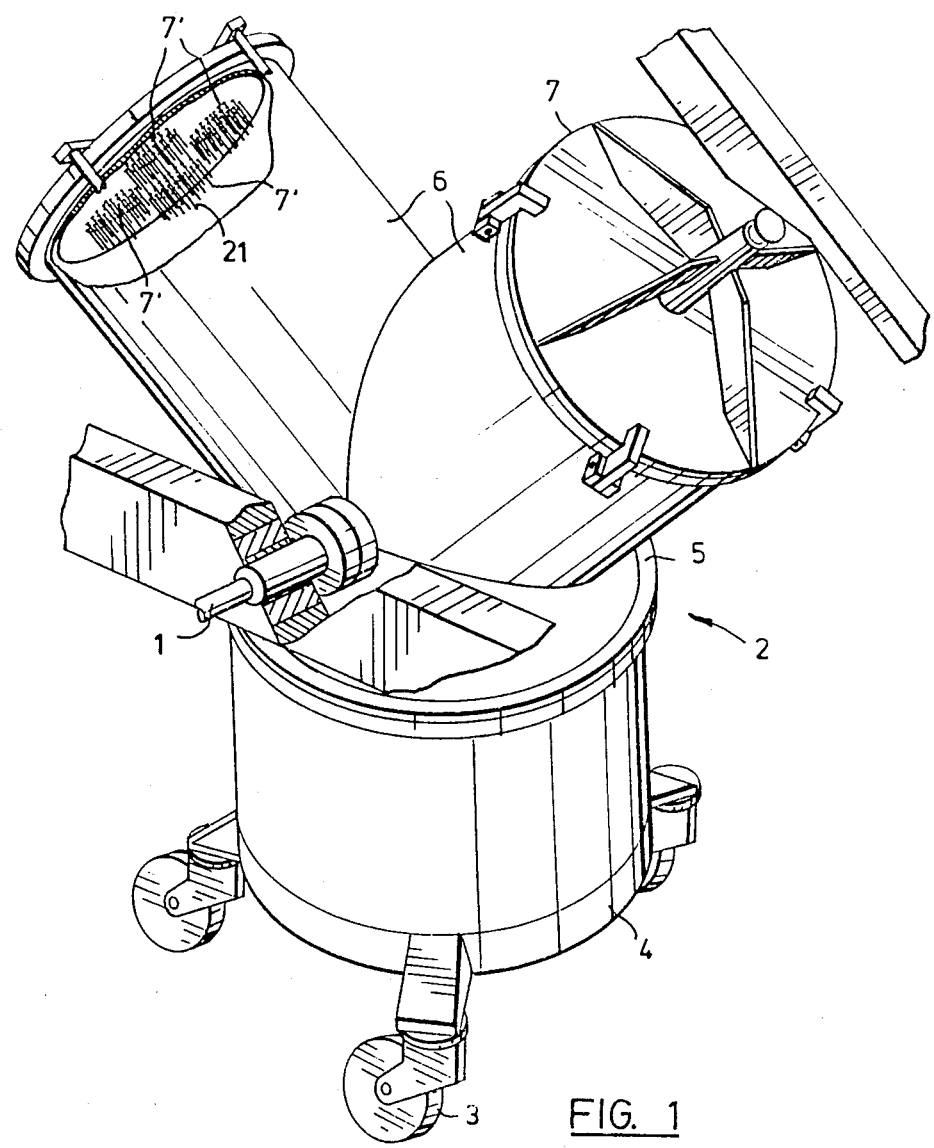

United States Patent [19]

Langen et al.

[11] Patent Number: 4,784,055

[45] Date of Patent: Nov. 15, 1988

[54] APPARATUS FOR INJECTING MEAT WITH A SUBSTANCE, IN PARTICULAR A SUBSTANCE OF A PASTE-LIKE CONSISTENCY

[75] Inventors: Johannes C. Langen; Christianus P. Langen, both of Cuijk, Netherlands

[73] Assignee: Langen Research B.V., Cuijk, Netherlands

[21] Appl. No.: 51,595

[22] Filed: May 20, 1987

[30] Foreign Application Priority Data

May 23, 1986 [NL] Netherlands .......................... 8601328

[51] Int. Cl.$^4$ .......................... B02B 3/12; B02B 23/00
[52] U.S. Cl. ......................................... 99/533; 99/535

[58] Field of Search ................ 99/532, 533, 535, 516; 17/25, 51; 69/30; 426/518, 519, 302, 464, 473, 641, 642

[56] References Cited

U.S. PATENT DOCUMENTS 4,356,762 11/1982 Langen .................................. 99/533

Primary Examiner—Timothy F. Simone
Attorney, Agent, or Firm—Fetherstonhaugh & Co.

[57] ABSTRACT

This invention relates to an apparatus for injecting a fluid substance into a portion of meat. In particular, this invention relates to an apparatus for injecting a fluid substance having a paste-like consistency through needles into a portion of meat wherein a uniform dose of fluid is injected through each needle.

8 Claims, 4 Drawing Sheets

APPARATUS FOR INJECTING MEAT WITH A SUBSTANCE, IN PARTICULAR A SUBSTANCE OF A PASTE-LIKE CONSISTENCY

This invention relates to an apparatus for injecting a fluid substance into a portion of meat. In particular, this invention relates to an apparatus for injecting a fluid substance having a paste-like consistency through needles into a portion of meat wherein a uniform dose of fluid is injected through each needle.

The injection of a fluid such as a curing fluid into a meat portion such as a ham or the like is well-known. A plurality of hollow needles are driven into the meat portion and fluid is injected through the needles into the meat portion. This process may be a single injection or it may be repeated several times on the same meat portion. The fluid substance which is to be injected is generally supplied through a supply conduit to a header or manifold which communicates with a system of channels incorporated in the base which supports the needles in an attempt to provide a substantially uniform distribution of the fluid to the various needles. During the injection of a fluid such as a paste-like substance, there is a tendency for the needles which offer the least resistance to be supplied with the greatest quantity of the fluid, while the other needles which offer a greater resistance receive little or none of the fluid and consequently, the fluid distribution throughout the meat portion can vary substantially.

It is an object of the present invention to overcome the difficulties of the prior art described above and provide an apparatus in which a predetermined dose of the fluid substance is dispensed through each needle in use.

It is a further object of the present invention to provide a machine for injecting a fluid substance into a portion of meat in which a dosage chamber is associated with each needle and serves to receive a predetermined dose of the injectable fluid from a manifold and is then operable to discharge the predetermined dose through its associated needle.

By providing a dose-measuring chamber, it is possible to fill the dose-measuring chamber at a time when its associated needle is not in contact with the meat portion. This permits a predetermined quantity of the fluid substance to be accumulated in close proximity to each needle such that as soon as the needle is driven into the portion of meat, the dose of fluid which is accumulated in the dose metering chamber can be discharged through its associated needle. As a result, the dose which is discharged through each needle is substantially equal.

SUMMARY OF INVENTION

According to one aspect of the present invention, there is provided an apparatus for injecting a portion of meat with a substance, in particular a substance of a paste-like consistency, said apparatus consisting substantially of a base having a number of parallel oriented needles, the channel of each needle communicating with a closable common supply conduit for said substance, characterized in that a dose-measuring chamber is arranged in association with each needle channel, said chamber being closable by sealing means with respect to the common supply conduit, on the one hand, and with respect to the channel of the needle, on the other hand.

According to a further aspect of the present invention, there is provided a machine for injecting a fluid substance into a portion of meat comprising a needle support base, a plurality of injection needles each having a proximal end mounted in said support base and a distal end projecting from said support base, said needles each having an injection passage opening longitudinally therethrough from its proximal end to its distal end, a fluid manifold chamber in said base for receiving the fluid substance from a source, a plurality of dosage chambers in said base, one of said dosage chambers being associated with each needle for supplying an individual dose of fluid to its associated needle, sealing means between the manifold chamber and each dosage chamber and between each dosage chamber and the injection passage of its associated needle, said sealing means being operable to permit fluid to pass from the manifold chamber into each dosage chamber while preventing the passage of fluid from each dosage chamber through the injection passage of its associated needle and, to prevent the passage of fluid from the manifold chamber into the dosage chambers while permitting fluid to pass from the dosage chambers through the injection passages of the needles whereby substantially uniform predetermined dosages of fluid are dispensed through each injection needle during injection.

Figure 2:
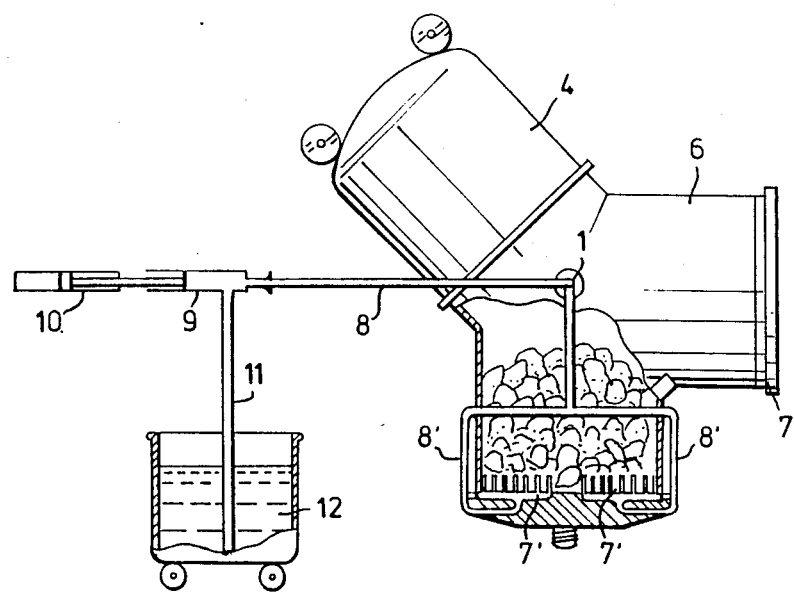
Figure 5:
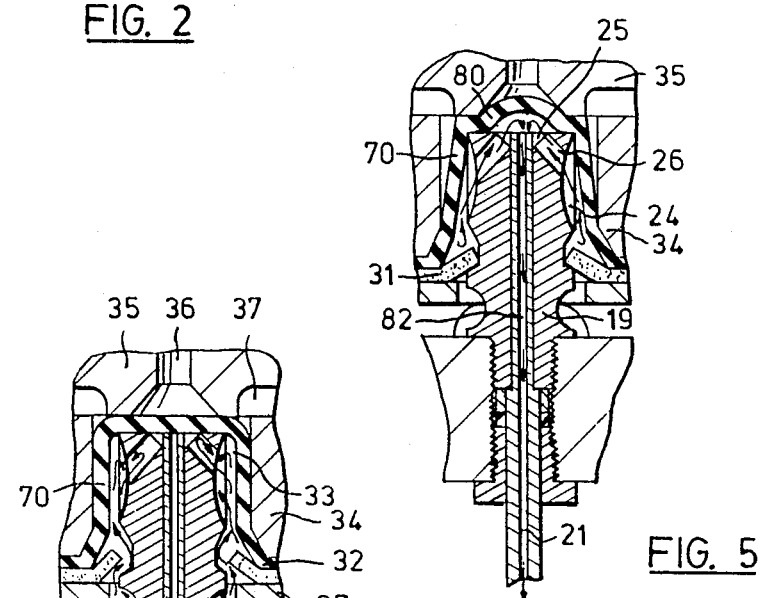
Figure 6:
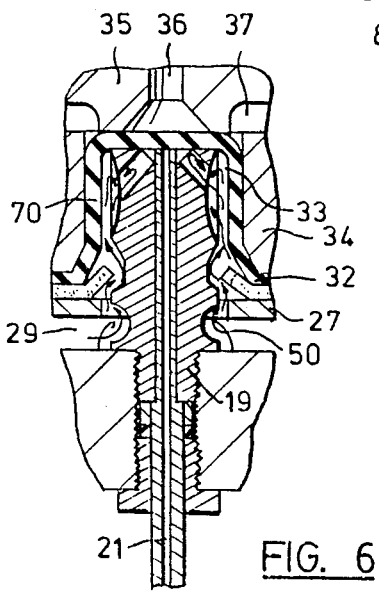
Figure 3:
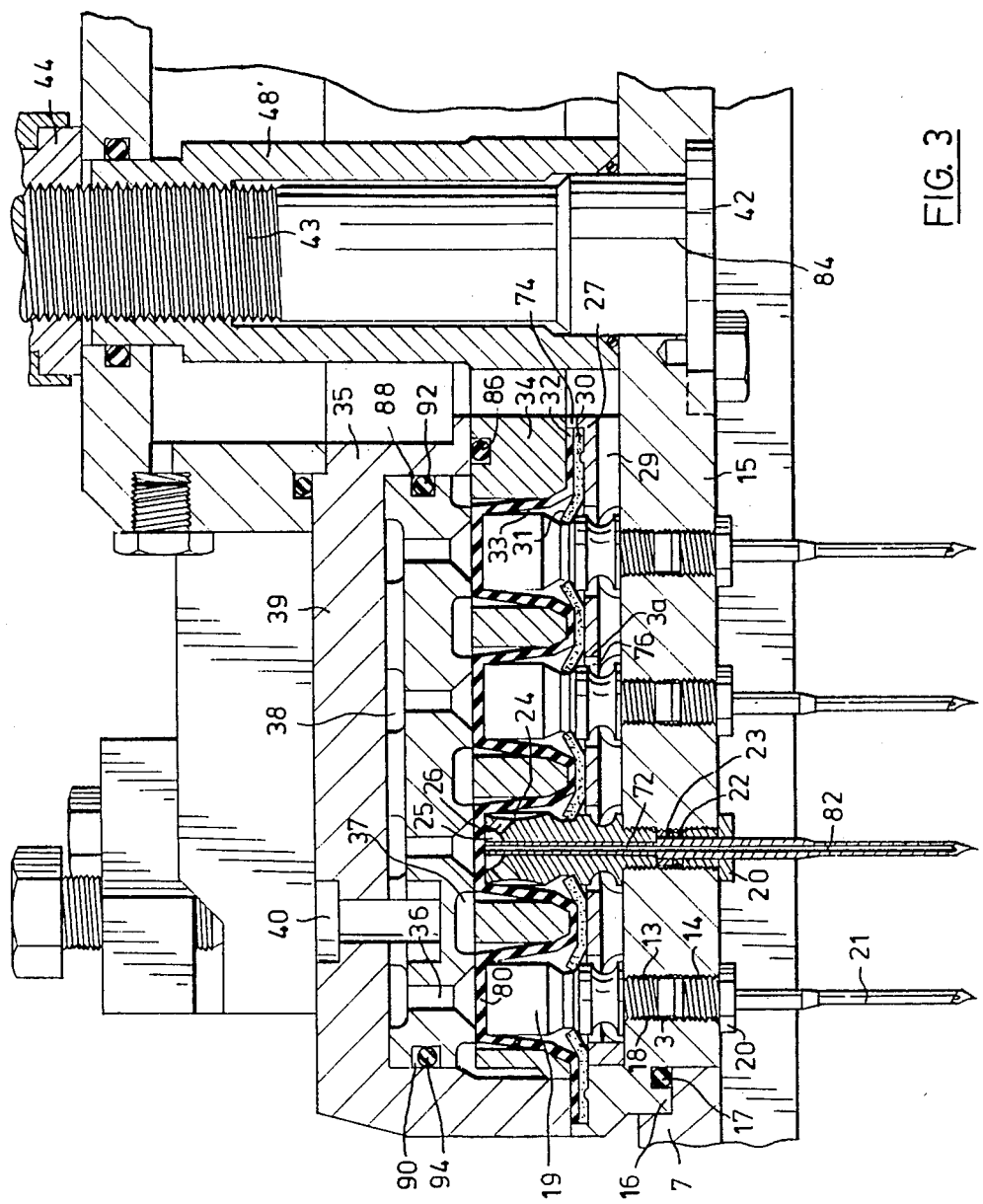
Figure 4:
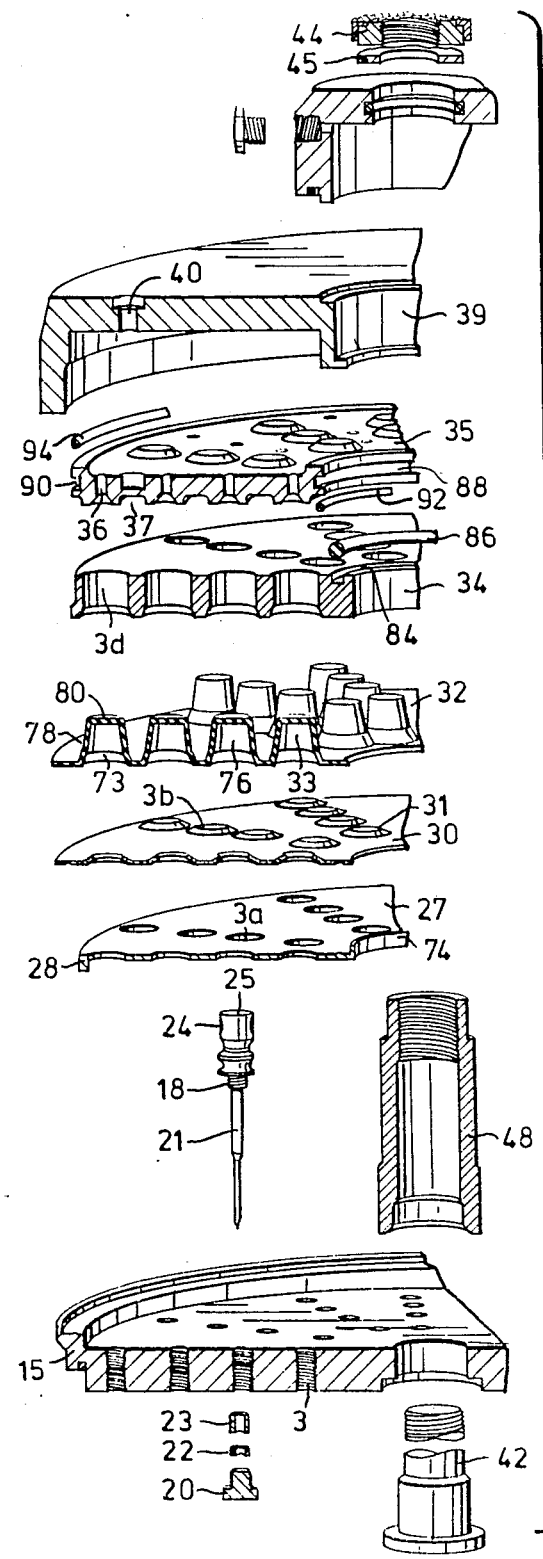

The invention will be more clearly understood after reference to the following detailed specification read in conjunction with the drawings wherein;

FIG. 1 is a perspective top view of a meat massaging machine of the type in which the injection apparatus of the present invention may be incorporated, FIG. 2 is a diagrammatic partially sectioned side view of the apparatus of FIG. 1, FIG. 3 is a sectional view taken along the line 3—3 of FIG. 1, FIG. 4 is an exploded view of the portion of the apparatus illustrated in FIG. 3, FIG. 5 is an enlarged detail illustrating the proximal end of a needle and the dose-metering chamber associated therewith, FIG. 6 is a view similar to FIG. 5 illustrating a further embodiment of the present invention.

With reference to FIG. 1 of the drawings, the reference numeral 2 refers generally to an assembly of vessels which are mounted for rotation about a shaft 1. The vessel assembly 2 consists of three cylindrical sections which project radially from the shaft 1. The reference numeral 4 refers generally to a detachable tub which is mounted on wheels 3. The detachable tub 4 is the container in which the meat portions are initially transported to the massaging apparatus. The tub 4 is detachably connected to the other sections along a flanged joint 5. The sections 6 are also cylindrical and each is provided with an end closing cap 7 which has an inner face directed toward the axis of the shaft 1. Each of the end closing caps 7 supports a plurality of hollow needles which project therefrom. The needles are arranged in groups 7' with each group being independently removable.

It will be apparent that by rotatably driving the vessel 2 about the axis of the shaft 1, the meat portions which are initially situated in the tub 4 will be caused to spill from the tub 4 into one or other of the containers 6 to be impaled on the needles 21.

As shown in FIG. 2 of the drawings, the needles of each group 7' communicate via a system of channels which are formed in the support plates which support each group through a conduit 8 to a supply plunger pump which is driven by an hydraulic or pneumatic cylinder 10. The plunger pump 9 communicates with a supply conduit 11 which extends into a supply vessel 12 in which the fluid medium is stored. The fluid medium may be in the form of paste-like substance or it may be curing fluid.

The apparatus of the type described above is known and one such apparatus is described in our U.S. Pat. Nos. 4,036,122 and 4,356,762.

The needles which are mounted on each end closure cap 7 serve to inject the paste-like substance which is initially stored in the vessel 12 into the meat portions in use.

The fluid is supplied through a common supply conduit 8 which has four branches 8', one of which extends to each group of needles which are mounted on a circular needle base 15 (FIG. 3). Four needle base members 15 are mounted on each end closure cap 7. A branch conduit 8' communicates with a centrally arranged hub portion of each base 15. Each needle base 15 is circular and fits into a circular aperture in the end plate 7. The base 15 is formed with an outwardly directed flange 16 which bears against an inwardly directed flange which is formed on the end closure cap 7 and a sealing ring 17 is arranged between the flanges of the end cap 7 and the flange 16. The end plate 15 is formed with a plurality of threaded passages 18 which are uniformly spaced from one another in a predetermined pattern.

Each needle 21 has a hollow tubular body which projects from a head portion 19. The head portion 19 has a threaded end portion 18 which in use is threaded into the threaded end 13 of the passage 3 which is formed in the needle base plate 15. A locking nut 20 is threaded into the threaded end portion 14 of the passage 3 and serves to clamp a spacer sleeve 23 and an O-ring 22 against the lower end of the threaded portion 18 of the head 19 of the needle.

The head 19 of the needle is also formed with an annular recess which is formed around a waist portion 24 of reduced diameter. The bore 72 which extends through the head portion 19 is counter to form a conical-shaped recess 25. Passages 26 extend from the waist-portion 24 through the head into the recess 25. It will also be noted that the end portion 21a of the needle projects into the recess 25 to the level of the upper end of the head portion 19.

The needle support base assembly includes a base plate 15 as previously indicated. In addition, a membrane support plate 27 is provided. The membrane support plate 27 has a cylindrical flange 28 extending about its outer perimeter and projecting downwardly therefrom and an inner flange 74 extending about its inner perimeter and projecting upwardly therefrom. A plurality of passages 3a are formed in the support plate 27 and arranged to by aligned with the passages 3 which are formed in the base plate 15. The flange 28 serves to support the plate 27 in a spaced relationship with respect to the base plate 15 to form a manifold chamber 29 therebetween. The passages 3a are of a larger diameter than the head portions 19 of the needles which extend therethrough in use so that an annular passage 76 is formed between the plate 27 and each needlehead 19.

A first flexible membrance 30 is formed with a plurality of apertures 3b (FIG. 4) arranged to be aligned with the passages 3a. Each aperture 3b has a lip portion 31 projecting upwardly and inwardly therefrom which in the relaxed configuration shown in FIG. 3, serves to bear against the cylindrical wall of the head 19 of the needle which passes therethrough and serves to prevent the unrestricted passage of fluid from the manifold chamber 29.

A second membrane 32 is located above the first membrane 30 and is formed with a plurality of pockets 73 which are located in protuberancies 33. The pockets 73 are arranged to be aligned with the passages 3b of the first membrane 30. The second membrane 32 is also a flexible membrane. Each protuberance 33 has a cylindrical-shaped side wall 78 and an end wall 80. As shown in FIG. 3 of the drawings, the second membrane 32 is located above the first membrane 30 and a head portion 19 of a needle is located in each pocket 76.

The end wall 80 of each protuberance extends across the upper end of each head portion 19 and serves to close the end of the needle mounted therein to prevent the direct passage of fluid from the pocket 76 into the injection passage 82 of the associated needle.

A spacer plate 34 is formed with a plurality of passages 3d which are arranged to extend around the protuberances 33. The spacer plate 34 also has an annular groove 84 in which an O-ring 86 is located. The lower face of the spacer plate 34 bears against the membrane 32 and serves to clamp the membranes 32 and 34 against the membrane support 27 so as to seal the adjacent pockets 76 with respect to one another. The upper face of the spacer plate 34 extends in the plane of the upper end 80 of each protuberance.

The passages 3d are sufficiently large to provide a substantial clearance space between the spacer plate 34 and the side walls 78 of each protuberance.

A closure plate 35 is positioned above the spacer plate 34. The closure plate 35 is formed with a plurality of passages 36 which are arranged to be aligned with the passages 3d. The passages 36 are of substantially small diameter such that the lower face of the plate 35 which extends around the perimeter of the passages 36 will serve to clamp the underlying portions of the membrane 36 against the underlying head 19 so as to form a seal about the edge of the recess 25. Channels 88 and 90 are formed in the side edges of the plate 35 to receive sealing O-rings 92 and 94 respectively. A plurality of cavities 37 are formed on the underface of the closure plate 35 and are arranged to be located above the spaces formed between the side walls 78 of the protuberances and the adjacent wall of the spacer plate 34. The cavities 37 are interconnected to form a network of cavities through which a positive pressure may be applied to the exterior of the side walls 78 of the protuberances. A pattern of cavities 38 are also formed on the upper face of the closure plate 35 and are interconnected so that atmospheric or a negative pressure may be applied to the end wall 80 of each protuberance through the passages 36. An end cap plate 39 is mounted above the closure plate 35. A passage 40 opens through the top wall of the end plate 39 and a passage 41 opens through the side wall of the end plate 39. The passage 40 communicates with the passages 36 which are formed in the closure plate 35 and the passage 41 communicates with the network of passageways 37.

A collar 47 is located above the end cap plate 39 and is clamped between the end cap 39 and a top plate 46.

The base assembly is held together by means of a post 42 which has an enlarged head portion seated in a recess formed in the needle base plate 15 and a threaded upper end portion 43 which projects above the top plate 46. A washer 45 is located between the end plate 46 and a nut 44 which is threaded on the threaded end portion 43. A sleeve-like cylindrical hub 48 is located between the base plate 15 and the top plate 46. An annular chamber 92 is formed around the hub 84 and a passage 49 opens from the chamber 92 through the collar 47. The passage 49 communicates with the branch conduit 8'.

In use, the fluid substance which is to be injected which as previously indicated, may be in a paste-like form, is pumped through the branch conduits 8', through the passage 49 into the chamber 92 through which it passes to the manifold chamber 29. The pressure applied to the fluid by the pump 10 is sufficient to cause the lip 31 of the first membrane 30 to be deflected outwardly away from their associated head portion 19 so that fluid can pass into the pockets 76 formed in the second membrane to fill the annular cavity formed about the waist 24. The fluid will also pass through the passages 26 into the recess 25. The pressure in the fluid is not, however, sufficiently great to deflect the end wall 80 of the protuberances to provide access to the bore 82 of the needle 12. When the pockets 76 are filled with the fluid which is to be injected, each pocket will contain a separate "dose" which will be injected through its associated needle. It will be noted that the capacity of each pocket is substantially the same with the result that each "dose" will be of substantially the same volume. After the entire dose measuring chamber has been filled and a portion of meat has been impaled on at least some of the needles, the next step in the injection process is initiated by supplying air under pressure through the inlet 41 and channels 37 to the space formed outwardly from the side walls 78 of the protuberances 33. The pressure in the passages 36 which extend above the top wall 80 of the protuberances is less than the pressure applied to the side walls 76 of the protuberances with the result that the side walls 76 are deflected inwardly and the top wall 80 is deflected outwardly as shown in FIG. 2 so that the "dose" of fluid is discharged through the bore 82 of the needle 21 into the meat portion impaled on the needle 21 in use or directly into the container in which the needles 21 are accommodated. It will be noted that the lip portions 31 of the lower membrane form a one-way valve which will only permit the fluid to pass into the dose forming chamber.

After the completion of the injection step, the pressure supplied through the passage 41 is relieved and a new charge of fluid is admitted to the dose forming chamber to establish a new dose such that the process can be repeated as previously described.

From the foregoing it will be apparent that a dose-measuring chamber of a fixed capacity is associated with each needle and consequently, each needle will receive the same quantity of injection fluid. This ensures that there will be an even distribution of fluid through each of the injection needles and consequently a similar even distribution of injectable fluid will be achieved in the meat product.

In the modification illustrated in FIG. 6 of the drawings, the first membrane 30 is ommitted. The membrane support plate 27 is formed with passages 50. The membrane 32 is arranged to initially close the passages 50 but is deflectable under the influence of the pressure in the injectable fluid to permit the passages 50 to open to allow a charge of fluid to enter the dose forming chamber. When a positive pressure is applied through the passage 41 as previously described, the side walls 70 will be deflected inwardly as previously described and this will cause the membrane 32 to close the passages 50 to isolate the dose which is located in the dose forming chamber from the manifold chamber 29 so that it is discharged through the needle as previously described.

These and other modifications of the present invention will be apparent to those skilled in the art.

It will be apparent from FIG. 4 of the drawings that the entire assembly can be disassembled with ease simply by removing the clamping nut 44.

We claim:
1. A machine for injecting a fluid substance into a portion of meat comprising;
   (a) a needle support base,
   (b) a plurality of injection needles each having a proximal end mounted in said needle support base and a distal end projecting from said needle support base, each of said needles having an injection passage opening longitudinally therethrough from its proximal end to its distal end,
   (c) a fluid manifold chamber in said needle support base for receiving the fluid substance,
   (d) a plurality of dosage chambers in said needle support base, one of said dosage chambers being associated with each needle for supplying an individual dose of fluid to its associated needle,
   (e) one-way flow control means between the fluid manifold chamber and each dosage chamber and between each dosage chamber and the injection passage of its associated needle, said one-way flow control means being operable to permit fluid to pass from the manifold chamber into each dosage chamber while preventing the passage of fluid from each dosage chamber through the injection passage of its associated needle and to prevent the passage of fluid from the fluid manifold chamber into the dosage chambers while permitting fluid to pass from the dosage chambers through the injection passages of the needles whereby substantially uniform predetermined dosages of fluid are dispensed through each injection needle during injection.

2. In a machine for injecting a fluid substance into a portion of meat, a plurality of injection needles mounted in a support base, each needle having an injection passage opening therethrough which has an input end and a discharge end, first passage means in the needle support base for supplying a fluid substance to said needles for injection therethrough and closure means normally closing the input end of each needle, the improvement of;
   (a) a plurality of dosage metering chambers formed in said needle support base, each needle having a dosage metering chamber associated therewith,
   (b) one-way means for admitting said fluid substance from said first passage into each metering chamber to fill each metering chamber with a predetermined dosage of said fluid substance, said
   (c) means for expelling said predetermined dosage of fluid substance from each dosage metering chamber and opening said closure means of the injection needle which is associated therewith to discharge the predetermined dosage through said associated injection needle.

3. A machine as claimed in claim 2, wherein said means for expelling said predetermined dosage of fluid substance from each dosage metering chamber comprises;
   (a) a flexible membrane which divides each dosage chamber into a dosage compartment and a pressure compartment, pressure distribution passage means formed in said base and communicating with each pressure compartment whereby each of said pressure compartments may be pressurized to deflect said flexible membrane to collapse the dosage compartment and thereby apply a sufficient pressure to the injection fluid to cause the closure means of the associated needle to open to permit the dosage which has been formed in the dosage chamber to discharge through the through passage of its associated needle.

4. A machine as claimed in claim 3, wherein said closure means for normally closing the input end of said needle is in the form of a flexible membrane which has an inner face and an outer face, said inner face extending in a face-to-face relationship with respect to the input end of each needle, second pressure distribution passage means in said base and communicating with said outer face of said flexible membrane, said second pressure distribution passage means serving to permit pressure to be applied to said flexible membrane to normally urge it to a position closing said input end of said needles.

5. A machine as claimed in claim 4, wherein the flexible membrane which normally closes the input end of the injection needle and the flexible membrane which divides the discharge chambers into dosage and pressure compartments are formed from a unitary sheet of flexible material.

6. A machine as claimed in claim 5, wherein said flexible membrane also acts as the one-way means for admitting said fluid substance to said metering chambers.

7. A machine as claimed in claim 3, wherein the input end of each needle is mounted in a holder which has a cylindrically-shaped side face, said holder extending into the dosage compartment of its associated needle, said flexible membrane extending in a face to face relationship with respect to at least a portion of the side face of each holder such that the dosage compartment is in the form of an annular chamber which extends around the cylindrical-shaped side face of the holder.

8. A machine as claimed in claim 7, wherein said needle holder has an end face in which a shallow recess is formed, said input end of said needle opening into said recess, said cylindrical-shaped side face being formed with an annular recess and passage means extending through said holder from said annular recess to shallow recess through which the fluid substance which is initially located in the dosage chamber may be transferred to the input end of it associated injection needle.

* * * * *